Patented Apr. 24, 1951

2,550,261

UNITED STATES PATENT OFFICE 2,550,261

PRESERVATION OF FOOD PRODUCTS

Lloyd B. Jensen, Chicago, Ill., assignor to Swift & Company, Chicago, Ill., a corporation of Illinois No Drawing. Application November 10, 1948, Serial No. 59,409

6 Claims. (Cl. 99—150)

The present invention relates to the preparation and use of an antibiotic substance, and more particularly to the preparation and use of an antimicrobial substance of plant origin.

The invention contemplates the utilization of an antibiotic substance naturally associated with tissues of the members of the plant Maclura pomifera, commonly called "bois d'arc" and Osage orange. I have found that especially the heartwood and root of the Osage orange tree yield an antibiotic substance of great potency as hereinafter more fully described.

Therefore, an object of the present invention is to provide a potent antibiotic substance of plant origin.

A further object of the invention is to provide an antibiotic substance which is non-toxic to humans.

An additional object of the invention is to provide an antibiotic substance which is heat stable.

Another object of the invention is to employ an antibiotic substance having an origin in a vegetative plant as an effective preservative for food products.

In achieving the objects of the present invention, finely cut or ground wood, bark, or fruit of the Osage orange tree is treated with a suitable organic solvent, such as acetone. The acetone layer containing the constituents of the plant tissue soluble therein is separated from the acetone-insoluble fibrous mass, the acetone removed therefrom, and the extract taken up in a carrier solvent, such as ethanol.

The following examples illustrate preferred embodiments of the invention, and the tests falling thereunder illustrate the potency of the material obtained in accordance with the processes of the examples.

Example 1.—150 grams of the heartwood of the Osage orange tree were finely ground. The ground wood was placed in a flask and covered with acetone. The flask was held at room temperature for approximately 48 hours and shaken at intervals. The acetone layer containing the acetone-soluble constituents of the Osage orange wood was separated from the insoluble material by filtration, and the acetone was distilled off at 42° C. The residue was taken up in ethyl alcohol (95 per cent) so that 1 ml. of the alcoholic extract contained the acetone soluble material in 5 grams of the Osage orange wood.

In order to evaluate the effectiveness of the antibiotic material in the alcohol solution obtained in accordance with Example 1, the following test was performed:

Serial dilutions of the extract were made in 10 cc. broth tubes and the tubes inoculated with bacteria. Each 10 ml. broth tube contained approximately 75,000 cells of a food poisoning strain of Staphylococcus aureus, Salmonella typhimurium, Bacillus niger, Aspergillus niger, Aspergillus glaucus and Penicillium notatum. The tubes were allowed to incubate at a temperature of 37° C. and inspected for bacterial growth at the end of 1, 2, 5 and 8 days. In the following table are tabulated the results obtained with the aforesaid bacteria. The minus signs in said table indicate no bacterial growth, and the positive signs indicate the presence of viable bacteria at the incubation periods specified.

Table I

| Dilution in Difco Nutrient Broth | Time Held, days | Organisms tested [1] | | | | | | |
|---|---|---|---|---|---|---|---|---|
| | | Staph. aureus | Salmonella typhimurium | Pseudomonas fluorescens | Bacillus niger | Aspergillus niger | Aspergillus glaucus | Penicillium notatum |
| 1:100 | 1 | – | – | + | – | – | – | – |
| | 2 | – | – | | – | – | – | – |
| | 5 | – | – | | – | + | – | – |
| | 8 | – | ++ | + | – | + | – | + |
| 1:500 | 1 | – | – | | – | – | – | – |
| | 2 | – | – | | – | – | – | – |
| | 5 | – | – | | – | + | + | + |
| | 8 | – | ++ | + | + | + | + | + |
| 1:1,000 | 1 | + | + | + | + | + | + | + |
| | 2 | | | | | | | |
| | 5 | | | | | | | |
| | 8 | | | | | | | |
| 1:2,000 | 1 | + | ++ | + | + | – | – | – |
| | 2 | | | | | + | + | + |
| | 5 | | | | | | | |
| | 8 | | | | | | | |
| Control Culture | 1 | + | ++ | + | + | – | – | – |
| | 2 | | | | | + | + | + |
| | 5 | | | | | | | |
| | 8 | | | | | | | |

[1] Each 10 ml. contains approximately 75,000 cells.

The data given in the above table indicate that the antibiotic effects of the Osage orange wood extract vary in potency when tested against different organisms. Thus, the extract kills Staphylococcus in dilutions of 1 to 1,000, *Bacillus niger, Aspergillus niger, Aspergillus glaucus* and *Penicillium notatum* in dilutions as high as 1 to 500 for limited periods of time. The bactericidal properties of the extract, lethally effective in the dilutions indicated for the various organisms, were demonstrated by inoculating nutrient agar plates with 0.1 cc. of the aforesaid dilutions which had been allowed to incubate for 5 days. After 3 days' incubation of the inoculated plates no viable bacteria were observed as a result of the transfers.

*Example II.*—150 grams of the root of the Osage orange tree were finely ground. The ground root was placed in a flask and covered with acetone. The flask was held at room temperature for approximately 48 hours and shaken at intervals. The acetone layer containing the acetone-soluble constituents of the root was separated from the insoluble material by filtration, and the acetone removed from the extract by distillation under reduced pressure at 42° C. The residue was taken up in ethyl alcohol (95 per cent) so that 1 ml. of the alcoholic extract contained the acetone-soluble material in 5 grams of Osage orange root.

In order to evaluate the effectiveness of the antibiotic material in the alcohol solution obtained in accordance with Example II, the following test was performed:

Serial dilutions of the extract were made in 10 cc. broth tubes and the tubes inoculated with bacteria. Each 10 ml. broth tube contained approximately 75,000 cells of a food poisoning strain of *Staphylococcus aureus, Salmonella typhimurium, Bacillus niger, Aspergillus niger, Aspergillus glaucus* and *Penicillium notatum*. The tubes were allowed to incubate at a temperature of 37° C. and inspected for bacterial growth at the end of 1, 2, 5 and 8 days. In the following table are tabulated the results obtained with the aforesaid bacteria. The minus signs in said table indicate no bacterial growth, and the positive signs indicate the presence of viable bacteria at the incubation periods specified.

*Table II*

| Dilution in Difco Nutrient Broth | Time held days | Organisms tested [1] | | | |
|---|---|---|---|---|---|
| | | Staph. aureus | Salmonella typhimurium | Pseudomonas fluorescens | Bacillus niger |
| 1:100 | 1 | − | − | + | − |
| | 2 | − | + | | − |
| | 5 | − | | | − |
| | 8 | − | | | − |
| 1:500 | 1 | − | + | + | − |
| | 2 | − | | | − |
| | 5 | − | | | − |
| | 8 | − | | | − |
| 1:1000 | 1 | − | + | + | − |
| | 2 | − | | | − |
| | 5 | + | | | − |
| | 8 | + | + | + | + |
| 1:2000 | 1 | + | | | |
| | 2 | + | | | |
| | 5 | | | | |
| | 8 | | | | |
| Control | 1 | + | + | + | + |
| | 2 | | | | |
| | 5 | | | | |
| | 8 | | | | |

[1] Each 10 ml. contains approximately 75,000 cells.

The data given in the above table indicate that the antibiotic effects of the Osage orange root extract vary in potency when tested against different organisms, and possesses antibiotic properties somewhat different than the extract from the heartwood of the Osage orange. Thus, the root extract kills *Staphylococcus aureus* and *Bacillus niger* in dilutions of 1 to 1,000, but has little effect on the other organisms tested. The bactericidal properties of the extract were demonstrated in the same manner as in Example I.

Although acetone is the preferred primary solvent, I have found that other organic solvents are suitable as the extracting solvent. For example, dioxane, ethyl acetate, methyl ethyl ketone and ethanol may be used. I have also found a water extraction of the antibiotic material to be only slightly effective as an antibiotic because of the proteinaceous material dissolved therein.

The heat stability of the antibiotic material was determined by heating a portion of the said material and then inoculating with *B. niger*, a variant strain of *B. subtilis*. The results of the foregoing tests are set forth in Table III.

*Table III*

| Time Heated | Temp. | Incubation in days | Dilutions of Heated antibiotic | | | | | |
|---|---|---|---|---|---|---|---|---|
| | | | 200 | 500 | 1,000 | 2,000 | 5,000 | Control |
| Min. | ° C. | | | | | | | |
| 15 | 60 | 1 | − | − | − | + | + | + |
| | | 4 | − | − | − | + | + | + |
| | | 6 | − | − | + | + | + | + |
| 1½ | 90 | 1 | − | − | − | + | + | + |
| | | 4 | − | − | + | + | + | + |
| | | 6 | − | − | + | + | + | + |
| 3½ | 100 | 1 | − | − | + | + | + | + |
| | | 4 | − | − | + | + | + | + |
| | | 6 | − | − | + | + | + | + |

It is obvious that many variations in the solvent treating process may be advantageously employed. For example, since the antibiotic material isolated from the Osage orange tree is heat stable, solvent temperatures may range from room temperature to boiling temperature of the solvent, with consequent variations in extraction time. The higher the temperature, generally the less time is required for extraction. Moreover, the extraction process may be carried out in one step, for example, with ethanol or with a mixture of solvents. I have found it preferable to process the antibiotic substance contained in the Osage orange by a two-stage solvent process involving first, treating the substance with a primary solvent which is substantially removed and then taking up the resulting extract with another solvent so as to form a solution which is a convenient form of using the product. I have found that acetone is a very effective primary solvent in producing the antibiotic substance from the plant tissue. After evaporating off the acetone, the preferred solution is made with a carrier solvent such as ethanol, which may be consumed internally without harm. By using ethyl alcohol I also utilize its well-known properties, such as non-toxicity and ability to prevent contamination.

In the processing of food products a serious problem is the preservation thereof, and although great strides have been made in improving the quality and keeping time of various food products by refrigeration, canning, curing, plant sanitation, etc., the problem of preservation of food requires the constant attention of the food processor to improve long-established methods of treating food and to devise new means of food control.

Food spoilage is due primarily to microbial action, and the species of microorganisms responsible for food deterioration are numerous. The sporing genera, Clostridium and Bacillus, for example, when contaminating food, cause food spoilage. Another serious concern of the food handler is food poisoning, which is often of an insidious nature because food products may be contaminated with one or more of the harmful bacteria referred to herein and yet appear organoleptically sound. Among the food poisoning bacteria, the most common food poisoner is Staphylococcus.

The antibacterial substance of the present invention may be used to retard or prevent microbial growth in various food products, all of which tend to harbor pathogenic organisms in varying degrees. The antibiotic material disclosed herein, therefore, may advantageously be employed, for example, in treating meat products, such as hams, sausages and canned meats; filled pastries, such as cream puffs, chocolate eclairs, custards, and the like; and canned vegetables to prevent swelling due to organisms, such as the genus Bacillus.

The invention will be more fully understood from the following description of methods of using the antibiotic substance.

As hereinbefore mentioned, I have found that the antibiotic reagent herein described is lethal to a number of microbes in a 1 to 1,000 dilution of the extract, the extract being of such strength that 1 ml. of the alcoholic solution thereof contained the acetone-soluble constituents in 5 grams of root. Therefore, the addition of 1 part of the solution to 1,000 parts of the conventional pickling solution will result in a meat product cured therewith which has a very marked increase in resistance to the development of pathogenic organisms.

The following is an example of a curing pickle stock, which may be used in a process for quick-curing hams when provided with antibiotic substance in the proportions outlined above; that is, the antibiotic substance is added in an amount such as to effect a 1 to 1,000 dilution of the antibiotic material of the arbitrary strength herein described (1 ml. = 5 g. of root).

To 100 gallons of a 90° Salometer solution there are added:

7 lbs. sodium nitrate
10 oz. sodium nitrite
20 lbs. sugar
378.5 cc. antibiotic solution Luncheon meat was cured according to conventional methods in which the antibiotic substance was present in a 1 to 1000 dilution. The meat product was placed in six 6-pound cans and retorted to an inside temperature of 155° F. and incubated at 99° F. After 30 days of incubation no swelling of the cans could be observed. The control cans swelled in one week.

A further example of the utility of the antibiotic material is their use in a cream filling for various pastries. To determine the effectiveness, a standard cream filling used in eclairs was inoculated with a bacterial solution containing 100,000 living Staphylococcus aureus S-1 per 100 ml. and the filling incubated at a temperature between 75° F. and 80° F. The results of the tests are given in Table IV.

Table IV

| Antibiotic | Dilution in cream filling | Incubated at 75°-80° F. Staphylococcus (S-1) per gram | | |
|---|---|---|---|---|
| | | 24 hrs. | 48 hrs. | 72 hrs. |
| Osage orange wood | 1-300 | — | — | 2,000,000 |
| No antibiotic | 0 | — | — | 140,000,000 |
| No staphylococci | 0 | 0 | 0 | 0 |

The foregoing tests indicate that the antibiotic preparation exerts a pronounced inhibiting action against the Staphylococcus aureus in cream fillings.

Obviously, many modifications and variations of the invention, as hereinbefore set forth, may be made without departing from the spirit and scope thereof, and therefore only such limitations should be imposed as are indicated in the appended claims.

I claim:

1. In the process of treating food products, the step of adding to a food product a small amount of an alcoholic solution of antibiotic substance derived from the plant Maclura pomifera to preserve said food product against pathogenic bacteria responsible for food poisoning and spoilage.

2. In the process of quick-curing meats, wherein a pickling solution is injected into said meat, the step of adding to said pickling solution a small amount of the antibiotic substance derived from the plant Maclura pomifera by treatment with a non-aqueous organic solvent whereby the growth of pathogenic bacteria responsible for food spoilage and poisoning in the meat is substantially retarded.

3. In the process of preparing pastries containing fillings subject to spoilage by pathogenic bacteria, the step of adding to the said filling a small amount of the antibiotic substance derived from the plant *Maclura pomifera* by treatment with a non-aqueous organic solvent whereby the growth of pathogenic bacteria is substantially retarded.

4. A meat pickle including a small amount of an antibiotic substance derived from the plant *Maclura pomifera* by treatment with a non-aqueous organic solvent.

5. A cream filling for pastries including a small amount of an antibiotic substance derived from the plant *Maclura pomifera* by treatment with a non-aqueous organic solvent.

6. In the process of treating food products, the step of adding to a food product a small amount of an antibiotic substance derived from the plant *Maclura pomifera* by treatment with a non-aqueous organic solvent to preserve said food product against pathogenic bacteria responsible for food poisoning and spoilage.

LLOYD B. JENSEN.

REFERENCES CITED

The following references are of record in the file of this patent:

UNITED STATES PATENTS

| Number | Name | Date |
| --- | --- | --- |
| 469,850 | Chesebrough | Mar. 1, 1892 |
| 2,084,864 | Paddock | June 22, 1937 |
| 2,098,110 | Schertz et al. | Nov. 2, 1937 |
| 2,117,478 | Hall | May 17, 1938 |
| 2,180,750 | Urbain | Nov. 21, 1939 |

OTHER REFERENCES

"Nature," May 13, 1944, vol. 153, page 598, article entitled "Antibacterial Substances in Green Plants."

"Chemical and Engineering News," September 1945, page 1622, article entitled "Penicillin as a Preservative."

"The American Woman's Cook Book," 1945, by Ruth Berolzheimer, published by Consolidated Book Publishers, Chicago, page 475.